United States Patent
Stolze et al.

(10) Patent No.: US 11,755,578 B2
(45) Date of Patent: Sep. 12, 2023

(54) CONTROLLING THE TIMING OF A DATABASE QUERY EXECUTION

(71) Applicant: International Business Machines Corporation, Armonk, NY (US)

(72) Inventors: Knut Stolze, Hummelshain (DE); Reinhold Geiselhart, Rottenburg-Ergenzingen (DE); Felix Beier, Haigerloch (DE); Luis Eduardo Oliveira Lizardo, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 17/140,213

(22) Filed: Jan. 4, 2021

(65) Prior Publication Data

US 2021/0216551 A1 Jul. 15, 2021

(30) Foreign Application Priority Data

Jan. 14, 2020 (EP) .................................... 20151596

(51) Int. Cl.
*G06F 16/245* (2019.01)
*G06F 16/2453* (2019.01)

(52) U.S. Cl.
CPC .. *G06F 16/24549* (2019.01); *G06F 16/24542* (2019.01)

(58) Field of Classification Search
None
See application file for complete search history.

(56) References Cited

U.S. PATENT DOCUMENTS

| 8,341,178 B2 | 12/2012 | Belknap | |
| 9,229,993 B2 | 1/2016 | Odenheimer | |
| 9,329,846 B1* | 5/2016 | August | G06F 16/90 |
| 9,535,953 B2 | 1/2017 | Abdellatif | |
| 9,910,892 B2 | 3/2018 | Krompass | |
| 11,113,294 B1* | 9/2021 | Bourbie | G06F 16/24568 |
| 2002/0152216 A1* | 10/2002 | Bouthors | G06F 16/9535 |
| 2012/0023090 A1* | 1/2012 | Holloway | G06F 16/95 707/E17.108 |
| 2015/0088970 A1* | 3/2015 | Wei | G06F 16/00 |
| 2015/0199431 A1* | 7/2015 | Brunet | G06F 16/9535 707/706 |
| 2016/0026683 A1* | 1/2016 | Sah | G06F 16/2453 707/770 |
| 2018/0246928 A1* | 8/2018 | Kim | G06F 16/2358 |
| 2018/0300370 A1* | 10/2018 | Brookler | G06F 16/24553 |

OTHER PUBLICATIONS

"Accelerator-only tables and in-database transformation", IBM Db2 Analytics Accelerator for z/OS Version 7.1 documentation, printed on Oct. 21, 2020, 3 pages.

(Continued)

*Primary Examiner* — Son T Hoang
(74) *Attorney, Agent, or Firm* — Stephen R. Yoder

(57) ABSTRACT

Controlling the timing of an execution of a database query for test purposes includes: receiving the database query, the database query comprising control code; the control code causing a database management system to control the timing of the execution of the database query within the database management system; executing the database query within the database management system.

20 Claims, 5 Drawing Sheets

(56) References Cited

OTHER PUBLICATIONS

"How to set Postgres parameters with a SQL statement in session level within the IBM DB2 Analytics Accelerator environment?", IBM Support, Modified date: Oct. 17, 2019, 3 pages.
Stolze et al., "Controlling the Timing of a Database Query Execution", European Application No. EP20151596.2, Filed Jan. 14, 2020, 35 pages.

* cited by examiner

CONTROLLING THE TIMING OF A DATABASE QUERY EXECUTION

BACKGROUND

The present invention relates in general to data processing systems, in particular, to a method for controlling the timing of an execution of a database query for test purposes, a database management system and an application system, as well as a computer program product and a data processing system.

Testing functionality in software products is a complex task. This is even more elevated in products like a database management system where multiple database management systems and a connecting component are involved. For example, there may exist a first database management system, which is the interface for applications, and a second database management system which is fully encapsulated. In such an environment, a database query, such as an SQL statement, which may be a read-only query and/or a data manipulation, may be sent to the first database management system, which determines whether it should be executed locally or passed on to the second database management system. In the latter case, the database query may need to be transformed to adhere to the SQL dialect of the second database management system.

Testing the database query execution in such an environment is problematic because the run time of the database query in the second database management system is difficult to control.

SUMMARY

A method for controlling the timing of an execution of a database query for test purposes is proposed. The method comprises (i) receiving the database query, the database query comprising control code; (ii) the control code causing a database management system to control the timing of the execution of the database query within the database management system; and (iii) executing the database query within the database management system.

According to an advantageous embodiment, the method may further comprise (i) receiving the database query on a first database management system; (ii) detecting an annotation associated with the received database query; (iii) based on the detecting, injecting control code into the database query, the control code causing a second database management system to control the timing of the execution of the database query within the second database management system; (iv) forwarding the database query to the second database system (20); and (v) executing the database query within the second database system.

Further, a database management system is proposed, configured to execute a method for controlling the timing of an execution of a database query for test purposes.

According to an advantageous embodiment, the database management system may further comprise at least a first database management system and a second database management system, connected by a connecting component, the database management system being configured to execute a method for controlling the timing of an execution of a database query for test purposes.

The second database management system may be fully encapsulated. Thus, the first database management system does not need to know the mechanisms of the second database management system. The second database management system may be manipulated in a transparent manner without disturbing the behaviour of the first database management system.

If there exists only one database management system then this single database management system is configured to performing functions of the first database management system and of the second database management system.

Further, an application system is proposed, configured to execute a method for controlling the timing of an execution of a database query for test purposes.

Further, a favourable computer program product is proposed for controlling the timing of an execution of a database query for test purposes. The computer program product comprises a computer readable storage medium having program instructions embodied therewith, the program instructions executable by the computer system to cause the computer system to perform a method comprising: (i) receiving the database query, the database query comprising control code; (ii) the control code causing a database management system to control the timing of the execution of the database query within the database management system; and (iii) executing the database query within the database management system.

Further, a data processing system for execution of a data processing program is proposed, comprising computer readable program instructions for performing the method described above.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
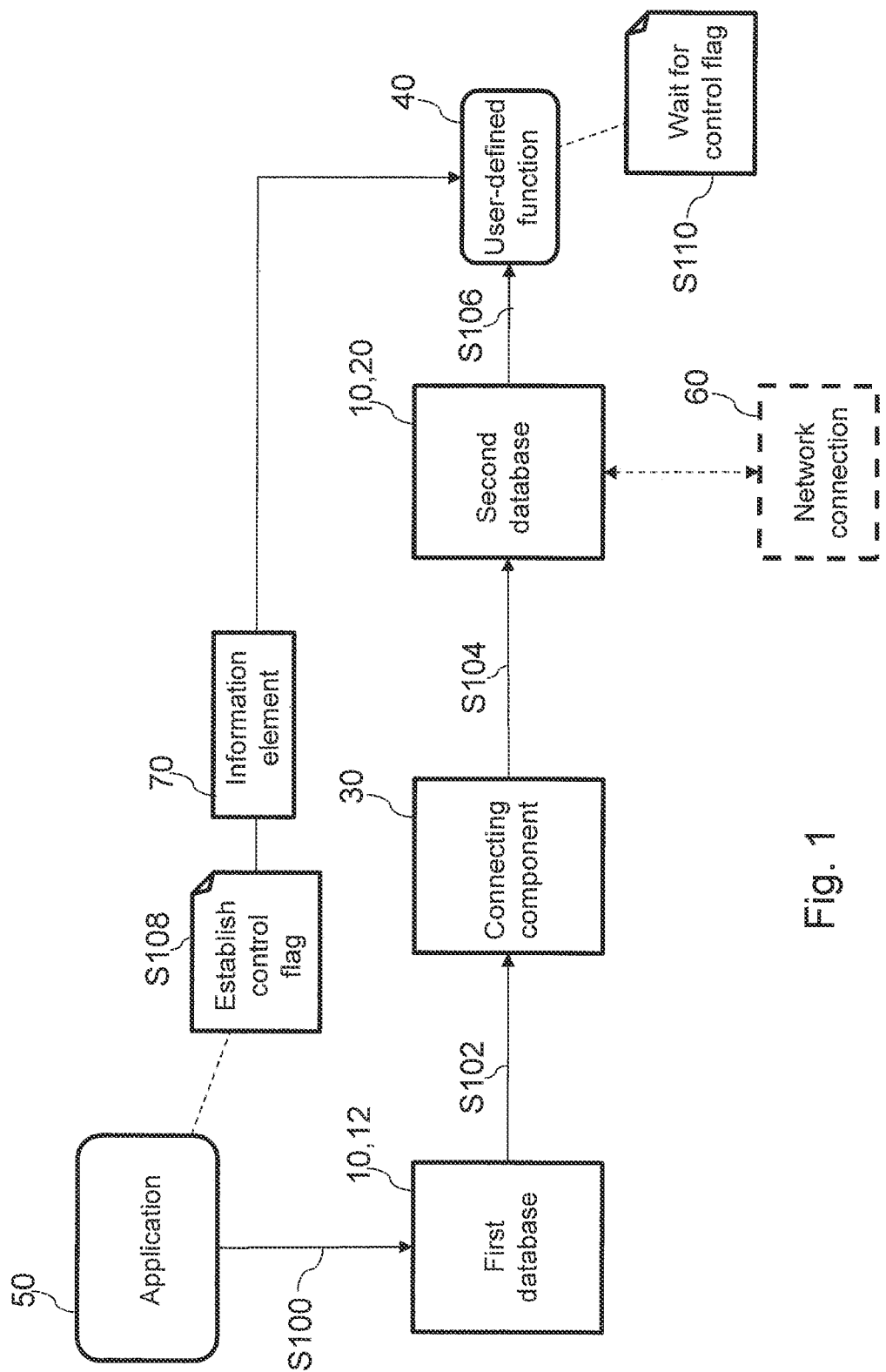
FIG. 1 depicts a schematic configuration of a database management system executing a database query from an application system according to an embodiment of the invention, where a file is created or manipulated in a file system that the second database management system can access.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method for controlling the timing of an execution of a database query for test purposes. The method comprises (i) receiving the database query, the database query comprising control code; (ii) the control code causing a database management system to control the timing of the execution of the database query within the database management system; and (iii) executing the database query within the database management system.

The illustrative embodiments are sometimes described herein using particular technologies only as an example for the clarity of the description.

FIG. 1 depicts a schematic configuration of a database management system 10, executing a database query from an application system 50 according to an embodiment of the invention, where a file is created or manipulated in a file system that the second database management system 20 can access. The database management system 10 comprises a first database management system 12 and a second database management system 20 interconnected by a connecting component 30.

The second database management system may be fully encapsulated. Thus, the application 50 as well as the first database management system 12 does not need to know the implementation details and internal mechanisms of the second database management system 20. The second database management system 20 may be manipulated in a transparent manner without disturbing the behaviour of the first database management system 12.

As a product for a customer, the application 50 may not even be aware of the second database management system 20. It communicates solely with the first database management system 12. Of course, for test purposes the application 50 may represent a test code, which has to be aware of the second database management system 20 and the connecting component 30.

The application system 50 may send a database query like an SQL statement to the first database management system 12. The database query where the execution shall be controlled may be annotated and then sent to the first database management system 12, step S100. The annotation may be in such a way that it remains part of the database query that is sent to the connecting component 30 in step S102 where the database query is augmented and passed on to the second database management system 20 for execution in step S104.

Augmenting the database query means injecting a control code to control the database query execution, e.g., by pausing the database query. Control code is injected into the database query by the connecting component 30, which receives the database query from the first database management system 12. The connecting component 30 sends S104 the database query including the control code to the second database management system 20.

A user-defined function 40 may be used, and the execution of the database query be paused in a controlled manner when that function 40 is invoked in step S106. Thus, the control code causes to delay the execution of the database query.

The function 40 comprises program code to be executed by the second database management system 20, the program code causing the second database management system 20 to control the timing of the execution of the database query.

According to an embodiment of the invention, annotating the database query for this special mode of execution may be to add a comment:
/* SQL QUERY WITH EXECUTION CONTROL: <token> */
SELECT . . . FROM . . . WHERE . . .

The connecting component 30 receives the database query with this comment. It applies at least a shallow parsing of the database query text and detects the comment, which may be used to switch to the additional code path handling augmenting of the database query. <token> may be an identifier for specifying a file name, e.g. of a file in a file system of the second database management system 20 to be used for controlling the timing of the database query execution.

According to a further embodiment augmentation of the database query may be achieved by using a so-called "optimizer hint". The optimizer hint causes the connecting component 30 to inject the control code into the database query. The first database management system 12 receives the optimizer hint from the application 50, and sends them to the connecting component 30 in a dedicated message, in the context of the database query execution. The connecting component 30 may receive these dedicated messages and is aware that it should apply the augmentation.

In order to control/pause the database query execution in the second database management system 20, it may be advantageous to exploit some interface/user-exit. A readily available interface are user-defined functions 40, which can be embedded in a database query. Whenever the result of the function 40 is needed during the execution of the database query, this function 40 is invoked by the second database management system 20.

The control code causes the second database management system 20 to control the timing of the execution of the database query based on control flag information generated by an application system 50.

The user-defined function 40 checks for a specific control flag information to be reached during execution of the database query. If this condition is not yet satisfied, the function 40 may block, either in a busy-loop or by sleeping briefly, and then recheck.

Different ways can be used for the control flag handling.

According to a first embodiment, which is depicted in FIG. 1, existence and/or content of a file in the file system of the second database management system 20 may be checked. The application code has to reach out to the second database management system and create the desired file at the appropriate point in time. The optimizer hint or comment as an annotation of the database query can encode identifiers, which the user-defined function 40 shall wait for. For example, the identifier may contain the file name, which is passed on to the user-defined function 40 as parameter so that the function 40 knows the correct file name. That allows multiple concurrent but independent exploitations as long as the file names are unique.

For this purpose the application 50 has to be able to place a file in the file system, which requires connectivity to the operating system of the second database management system 20, and/or knowledge about the file system structure. While this is often not possible for production systems, it is advantageous for test environments.

Controlling the timing of the execution of the database query may be achieved using an information element 70 provided by the application system 50. The information element 70 comprises a control flag information and may be stored in storage resources of the second database management system 20. The control code comprises an identifier of the information element 70.

The information element 70 may advantageously comprise a file stored in a file system where the second database management system 20 runs. The respective identifier hereby may comprise a file name of the file.

By this way the application system 50 establishes in step S108 a condition in the function 40 for controlling the timing of the execution of the database query in the database management system 10. The function 40 is waiting for the condition to be reached, which is depicted in FIG. 1 by step S110.

Figure 2:
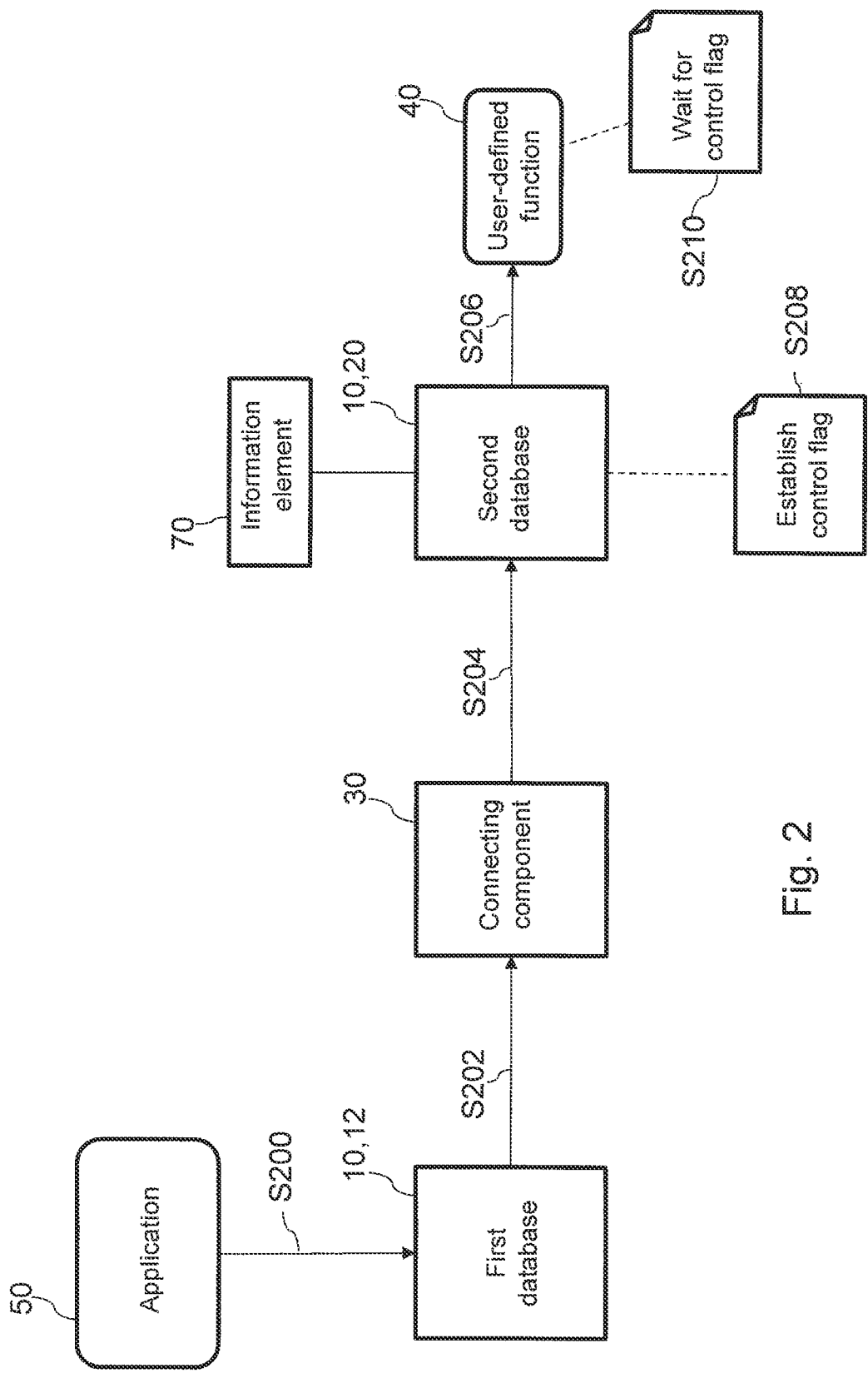
FIG. 2 depicts a schematic configuration of a database management system executing a database query from an application system according to a further embodiment of the invention, using a control table.

According to a second embodiment, which is depicted in FIG. 2, the user-defined function 40 may access another table, called "control table" in the same database of the second database management system 20.

FIG. 2 depicts a schematic configuration of a database management system executing a database query from an application system according to a further embodiment of the invention, using a control table.

A first communication path is going from the application 50 via S200 to the first database management system 12, via S202 to the connecting component 30, via S204 to the second database system 20 and via S206 to the function 40 to the condition waiting for the control flag, S210. A second path is going from the application 50 via S200 to the first database management system 12, via S202 to the connecting component 30, via S204 to the second database system 20, for establishing the control flag, S208 in the second database management system 20.

Using a control table, application 50 may not have or does not need to have access to the second database management system 20. Instead, it can use the path S200, S202, S204 via the first database management system 12, the connecting 30 and the second database management system 20 to manipulate the content of the control table. Thus, a single code path can be used. Using a control table does not require direct access from the application 50 to the system where the second database management system 20 runs. Instead, the first database management system 12 is the only communication point for the application 50.

The information element 70 may advantageously comprise a value maintained in a control table of the second database management system 20. The respective identifier hereby may comprise a specification of the location of the value within the control table.

The application 50 inserts/updates some data in that other table. Thread A executes a controller query. Thread B executes: INSERT INTO "control table" VALUES ('unblock'). The user-defined function 40 executes in a loop: SELECT COUNT(*) FROM "control table" WHERE condition='unblock'. Once this query returns a value>1, the function 40 terminates its loop and returns control to the calling database management system 20.

When augmenting the database query, advantageously the semantics of the result set for the database query is not changed. This can be done like:
SELECT*FROM (
 <original-query>) AS t
 WHERE control-function(<parameters>)=1
 ORDER BY ORDER OF t
The parameters passed to the control function 40 depend on the way this function 40 is implemented: It could the absolute path for the file being expected to be created, or it could be the fully qualified table name for the control table. The latter allows the usage of dedicated control tables, which makes parallel database query executions independent.

The control function 40 may implement more elaborate mechanisms, e.g. tolerate the first ten executions, but wait on a condition to occur on the eleventh call. In general, mechanisms like those supported by debuggers could all be supported.

Advantageously a very small data volume is sufficient. A database query with an arbitrarily long execution time can be accomplished with a couple rows in the target table already. Thus, the test data is quickly to be generated.

According to a further embodiment of the invention, the control code may cause the second database management system 20 to establish a network connection 60 for receiving information concerning controlling the timing of the execution of the database query, as is exemplified in FIG. 1 by the network connection 60 depicted in broken lines. The identifier of the information element 70 in this embodiment comprises information about a network endpoint to connect to, in particular an IP address and/or a port number.

Advantages of embodiments of the invention may be evident for testing cancellation of database queries in the second database management system. Verifying the code path that is responsible for the cancellation of a query depends on the execution of the query in the second database management system. In a test code thread A would start execution of the query by sending it to the first database management system which sends it to the second database management system. A thread B would cancel the query execution in the connecting component, which shall pass on the cancellation to the second database management system. The second database management system would cancel the SQL query execution and returns an SQL error. The SQL error is eventually propagated to thread A. If the query is executing too quickly, it could happen that thread B sends the cancellation to the second database management system after the query execution already finished. Hence, no SQL error will be emitted. This non-deterministic behaviour of the database management system may be overcome by applying the inventive method.

Further advantages might be evident regarding another scenario with concurrent execution with a test scenario like this: a thread A would start executing a query Q on a table T. The first database management system sends Q to the connecting component, which sends it to the second database management system. Thread B reloads all data in table T. Q is still running, accessing the data in table T. Thread A receives the query results and verifies it. It should have exactly the data as it was before the reload in the previous step took place. Verifying this behaviour is difficult to accomplish reliably. The query execution in the second database management system may already have scanned all the data of T before the reload finished. Or the reload may load new data, which is not scanned by Q anymore because Q already processed the data pages on which the new data is being inserted. This situation may be disregarded when applying the inventive method.

A typical approach in state of the art might be to increase the data volume processed by the query Q. However, setting up the data volume may be time consuming, or improvements in the product may introduce optimizer enhancements speeding up the execution by factors or even orders of magnitude. Thus, the test case may run unnecessarily long and/or may become instable over time, which is a liability for modern CI/CD pipelines where fast and reliable test cycles are desired. This increase of the data volume may be avoided when using the inventive method for controlling the timing of an execution of a database query for test purposes.

Figure 3:
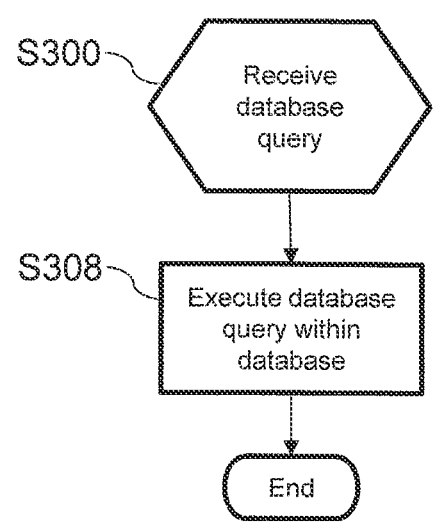
FIG. 3 depicts a flow chart for controlling the timing of an execution of a database query for test purposes within a database management system according to an embodiment of the invention.

FIG. 3 depicts a flow chart for controlling the timing of an execution of a database query for test purposes within a database management system according to an embodiment of the invention.

The method comprises: Receiving the database query in step S300, wherein the database query comprises control code. The control code causes a database management system to control the timing of the execution of the database query within the database management system. In step S308 the database query is executed within the database management system. According to this embodiment, the method may be executed within one database management system.

Figure 4:
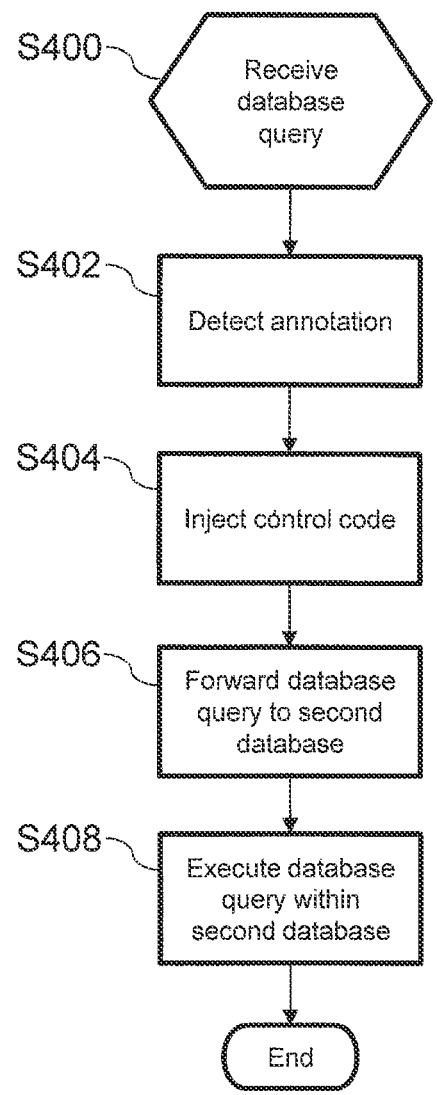
FIG. 4 depicts a flow chart for controlling the timing of an execution of a database query for test purposes within a database management system according to a further embodiment of the invention.

FIG. 4 depicts a flow chart for controlling the timing of an execution of a database query for test purposes within a database management system according to a further embodiment of the invention.

According to this embodiment, the method further comprises: Receiving the database query on a first database management system 12 in step S400. Next, in step S402, an annotation associated with the received database query is detected. Based on the detecting of the annotation, control code is injected in step S404 into the database query. The control code causes a second database management system 20 to control the timing of the execution of the database query within the second database management system 20. The database query is forwarded in step S406 to the second database management system 20 and executed in step S408 within the second database management system 20.

Figure 5:
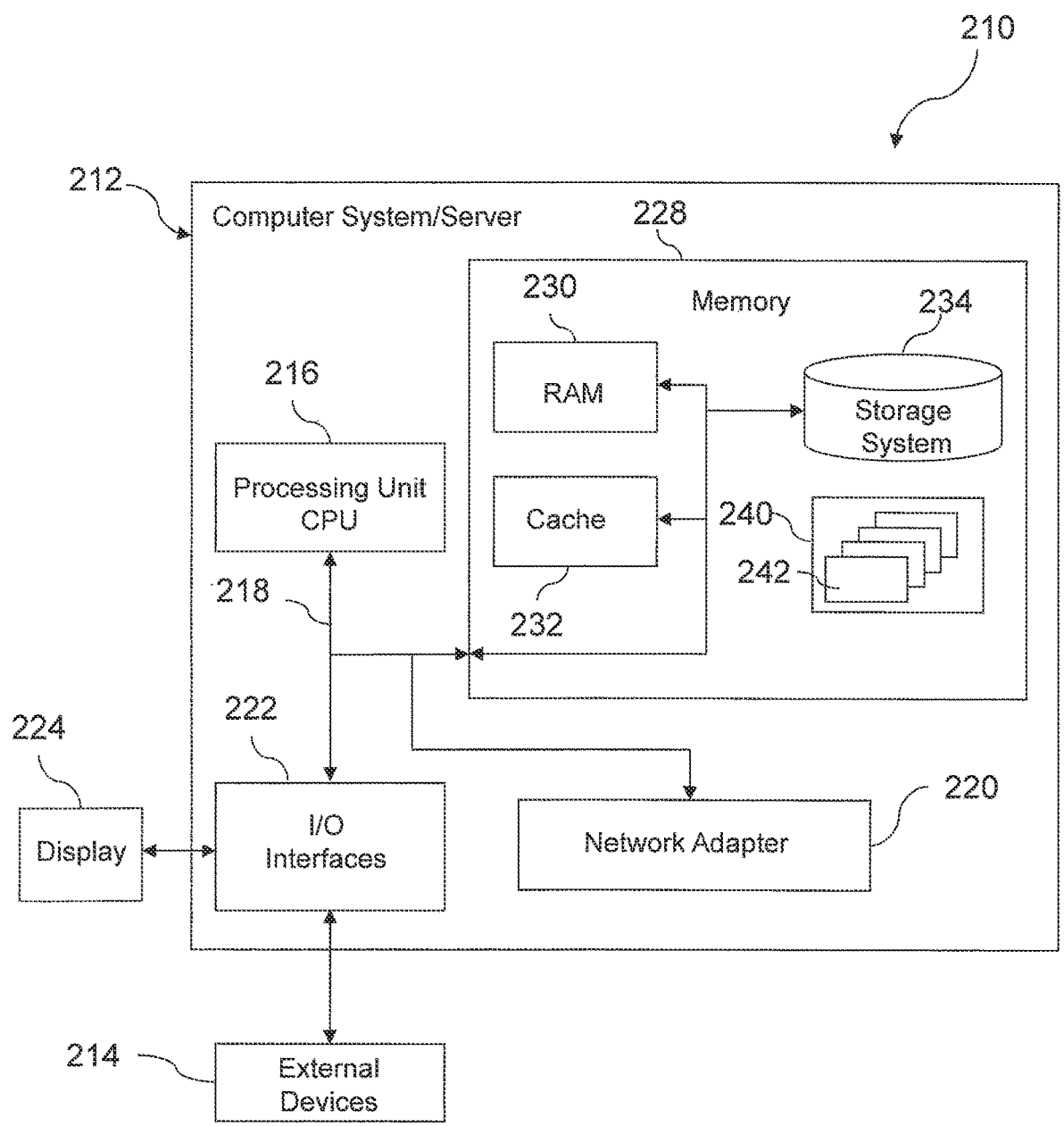
FIG. 5 depicts an example embodiment of a data processing system for executing a method according to the invention.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and an input/output (I/O) bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling the timing of an execution of a database query in a test environment, the method comprising:
receiving a database query by a first database management system from an application system;
detecting an annotation associated with the received database query;
responsive to detecting an annotation, injecting control code into the database query to create an augmented database query, the control code controlling a timing of execution of the database query, the control code including an identifier of an information element provided by the application system, the information element including control flag information and a value maintained in a control table of the second database system, the identifier including a specification of the location of the value within the control table;
forwarding the augmented database query to a second database management system;
executing the augmented database query within the second database management system, the injected control code causing the second database management system to control the timing of execution of the augmented database query according to the information element.

2. The method according to claim 1, wherein the injected control code further causes the second database management system to control the timing of the execution of the augmented database query based on control flag information.

3. The method according to claim 2, wherein the application system establishes the control flag information in a function comprising program code for controlling the timing of the execution of the database query in the second database management system, the function waiting for a corresponding control flag to be reached during execution of the database query.

4. The method according to claim 1, wherein the annotation comprises a comment added to a query statement of the database query.

5. The method according to claim 4, wherein the comment is used to switch to an additional code path handling augmenting in the database query.

6. The method according to claim 1, wherein the annotation comprises an optimizer hint associated with the database query.

7. The method according to claim 1, wherein injecting the control code comprises including in the database query a function comprising program code to be executed by the second database management system, the program code causing the second database management system to control the timing of execution of the database query.

8. The method according to claim 1, wherein the control code further causes the second database system to establish a network connection for receiving information concerning controlling the timing of execution of the database query, wherein the control code comprises information about a network endpoint to connect to including an IP address and/or a port number.

9. The method according to claim 1, wherein the control code causes a delay of the execution of the database query.

10. The method according to claim 1, wherein:
injecting the control code into the database query is performed by a connecting component, the connecting component receiving the database query from the first database management system.

11. The method according to claim 10, wherein the connecting component sends the augmented database query including the control code to the second database management system.

12. The method according to claim 10, further comprising:
receiving, by the first database management system, an optimizer hint;
sending, in a dedicated message to the connecting component, the optimizer hint causing to inject the control code into the database query.

13. The method according to claim 10, wherein the annotation is received by the connecting component causing to inject the control code into the database query.

14. The method according to claim 1, wherein the information element comprises a file stored in a file system where the second database management system runs, the identifier including a file name.

15. A computer system for controlling the timing of an execution of a database query in a test environment, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method comprising:
receiving a database query by a first database management system from an application system;
detecting an annotation associated with the received database query;
responsive to detecting an annotation, injecting control code into the database query to create an augmented database query, the control code controlling a timing of execution of the database query, the control code including an identifier of an information element provided by the application system, the information element including control flag information and a value maintained in a control table of the second database system, the identifier including a specification of the location of the value within the control table;
forwarding the augmented database query to a second database management system;
executing the augmented database query within the second database management system, the injected control code causing the second database management system to control the timing of execution of the augmented database query according to the information element.

16. The computer system according to claim 15, wherein the first database management system and the second database management system are connected by a connecting component.

17. The computer system of claim 16, wherein:
injecting the control code into the database query is performed by the connecting component; and
the connecting component receives the database query from the first database management system.

18. The computer system of claim 15, wherein the application system establishes the control flag information in a function comprising program code for controlling the timing of the execution of the database query in the second database management system, the function waiting for a corresponding control flag to be reached during execution of the database query.

19. A computer program product for controlling the timing of an execution of a database query in a test environment, the computer program product comprising a computer readable storage medium having program instructions embodied therewith, the program instructions executable by the computer system to cause the computer system to perform a method comprising:

receiving a database query by a first database management system from an application system;

detecting an annotation associated with the received database query;

responsive to detecting an annotation, injecting control code into the database query to create an augmented database query, the control code controlling a timing of execution of the database query, the control code including an identifier of an information element provided by the application system, the information element including control flag information and a value maintained in a control table of the second database system, the identifier including a specification of the location of the value within the control table;

forwarding the augmented database query to a second database management system;

executing the augmented database query within the second database management system, the injected control code causing the second database management system to control the timing of execution of the augmented database query according to the information element.

20. The computer program product of claim 19, wherein the application system establishes the control flag information in a function comprising program code for controlling the timing of the execution of the database query in the second database management system, the function waiting for a corresponding control flag to be reached during execution of the database query.

* * * * *